United States Patent
Petrie, Jr. et al.

(10) Patent No.: US 12,151,924 B2
(45) Date of Patent: Nov. 26, 2024

(54) FORCE IMPULSE TO MEASURE LOAD STABILITY

(71) Applicant: Ocado Innovation Limited, Hatfield (GB)

(72) Inventors: Joseph Petrie, Jr., Westwood, MA (US); Kurt Bilis, Arlington, MA (US); Michael Reilly, Winthrop, MA (US)

(73) Assignee: Ocado Innovation Limited, Hatfield (GB)

( * ) Notice: Subject to any disclaimer, the term of this patent is extended or adjusted under 35 U.S.C. 154(b) by 212 days.

(21) Appl. No.: 18/147,043

(22) Filed: Dec. 28, 2022

(65) Prior Publication Data

US 2024/0217796 A1    Jul. 4, 2024

(51) Int. Cl.
  *B66F 9/00*    (2006.01)
  *B66F 9/06*    (2006.01)
  *B66F 9/24*    (2006.01)

(52) U.S. Cl.
  CPC ............... *B66F 9/24* (2013.01); *B66F 9/063* (2013.01)

(58) Field of Classification Search
  CPC .................................. B66F 9/24; B66F 9/063
  See application file for complete search history.

(56) References Cited

FOREIGN PATENT DOCUMENTS

| CA | 3195339 A1 | 4/2022 |
|---|---|---|
| DE | 102020129274 A1 | 5/2022 |
| EP | 3712575 A1 | 9/2020 |

OTHER PUBLICATIONS

International Search Report and Written Opinion, dated Mar. 26, 2024, for International Patent Application No. PCT/EP2023/085807. (13 pages).

*Primary Examiner* — Mathew Franklin Gordon
(74) *Attorney, Agent, or Firm* — Seed IP Law Group LLP

(57) ABSTRACT

Systems and methods are disclosed for automated analysis of a load of a robotic vehicle. In one embodiment, a method (e.g., a computer-implemented method) includes lifting a load via a lifting mechanism of a robotic vehicle and applying a first pulse of force to the load. The method further includes obtaining, from one or more sensors, first sensor data related to movement of the load responsive to the first pulse of force applied to the load and determining one or more parameters related to the load based on the first sensor data. The method further includes performing one or more actions based on the one or more parameters related to the load. In this manner, the load is analyzed in an automated manner and appropriate action(s) (e.g., not moving the load because it is unstable, restricting acceleration/deceleration of the robotic vehicle while moving the load, etc.) can be taken.

20 Claims, 8 Drawing Sheets

FIG. 6

E-Commerce Platform | Search | JG John's Apparel / Jonny B. Good

- ⌂ Home
- 🧾 Orders
- ◇ Products
- ○ Customers
- ⊞ Reports
- ⊘ Discounts
- ⊞ Apps SALES CHANNELS ⊕
- ⊞ Online Store ◆
- ☐ Mobile App
- View all channels ⚙ Settings

Good afternoon, Jonny B.
Here's what's happening with your store today.

Today's total sales   Today's visits
$98.00            1

● Update your Platform Payments tax details
We require additional information to verify your identity.
[Update tax details]

● Advanced Cash on Delivery has been deactivated for your store
[See why]

All channels ▾ | Today ▾

TOTAL SALES
$98.00

$125
$75
$25

12am   4pm   8pm   11pm

Jun 1
2 orders

TOTAL SALES BY CHANNEL   Jun 1
View dashboard

Online Store                 0 orders
$0.00

Mobile app                   0 orders
$0.00

Shopify POS (126 York St.)   0 orders
$0.00

FORCE IMPULSE TO MEASURE LOAD STABILITY

TECHNICAL FIELD

The present disclosure relates to robotic vehicles and, more specifically, an automated process for determining whether a load to be moved by a robotic vehicle is stable.

BACKGROUND

Safety in the workplace is of utmost importance. Robotics are increasingly being used in the workplace such as, for example, in factories and warehouses. While robotics bring tremendous advantages, they also introduce safety challenges particularly when the robotics are operating alongside humans.

SUMMARY

Systems and methods are disclosed for automated analysis of a load of a robotic vehicle. In one embodiment, a method (e.g., a computer-implemented method) includes lifting a load via a lifting mechanism of a robotic vehicle and applying a first pulse of force to the load. The method further includes obtaining, from one or more sensors, first sensor data related to movement of the load responsive to the first pulse of force applied to the load and determining one or more parameters related to the load based on the first sensor data. The method further includes performing one or more actions based on the one or more parameters related to the load. In this manner, the load is analyzed in an automated manner and appropriate action(s) (e.g., not moving the load because it is unstable, restricting acceleration/deceleration of the robotic vehicle while moving the load, etc.) can be taken.

In one embodiment, the first pulse of force applied to the load is either a pulse of lateral force, a pulse of rotational force, or pulse of combined lateral and rotational forces. In one embodiment, the first pulse of force is applied to the load by the robotic vehicle.

In one embodiment, the one or more parameters related to the load include: a center of gravity of the load; a two-dimensional center of gravity of the load in a lateral plane (X-Z or Y-Z plane) of the load; an amplitude of a response of the load as represented by the first sensor data obtained from the one or more sensors responsive to the first pulse of force; a resonant frequency or natural frequency of the load; a damping factor of the load; one or more parameters indicative of an amount of movement or frequency of movement of the load; a polar moment of inertia of the load; at least one parameter that is based on the first sensor data from a first sensor of the one or more sensors relative to the first sensor data from a second sensor of the one or more sensors; or a combination of any two or more thereof.

In one embodiment, the first pulse of force applied to the load is one of a pulse of lateral force and a pulse of rotational force, and the method further comprises applying a second pulse of force to the load, the second pulse of force being the other of a pulse of lateral force and a pulse of rotational force and obtaining second sensor data from the one or more sensors responsive to the second pulse of force applied to the load, wherein determining the one or more parameters related to the load includes determining the one or more parameters related to the load based on both the first sensor data and the second sensor data.

In one embodiment, performing the one or more actions comprises determining one or more restrictions or limitations on movement of the robotic vehicle based on the one or more parameters of the load and operating in accordance with the one or more restrictions or limitations on movement of the robotic vehicle. In one embodiment, the one or more restrictions or limitations on movement of the robotic vehicle include: a restriction or limitation on a linear speed of movement of the robotic vehicle; a restriction or limitation on a linear acceleration of the robotic vehicle; a restriction or limitation on a linear deceleration of the robotic vehicle; a restriction or limitation on a rotational speed of movement of the robotic vehicle; a restriction or limitation on a rotational acceleration of the robotic vehicle; a restriction or limitation on a rotational deceleration of the robotic vehicle; or a combination of any two or more of the above.

In one embodiment, performing the one or more actions comprises determining whether it is safe for the robotic vehicle to move the load based on the one or more parameters of the load and operating in accordance with a result of the determining whether it is safe for the robotic vehicle to move the load.

In one embodiment, the one or more sensors include one or more pressure sensors. In one embodiment, the one or more sensors are located on the lifting mechanism. In one embodiment, the one or more sensors include one or more pressure sensors implemented within or affixed to the lifting mechanism. In one embodiment, the one or more pressure sensors are between a body of the lifting mechanism and a platform on which the load is positioned. In one embodiment, the lifting mechanism includes a forklift including a fork having two or more tines, and the one or sensors include one or more sensors integrated into or affixed to at least one of the two or more tines. In one embodiment, the one or more sensors integrated into or affixed to the at least one of the two or more tines comprises at least one pressure sensor integrated into or affixed to the at least one of the two or more tines. In one embodiment, the one or more sensors integrated into or affixed to the at least one of the two or more tines comprises at least one strain gauge integrated into or affixed to the at least one of the two or more tines. In one embodiment, one or more sensors include one or more sensors on one or more wheels of the robotic vehicle.

In one embodiment, performing the one or more actions comprises moving the load via the robotic vehicle, and the method further comprises, while moving the load via the robotic vehicle, obtaining third sensor data from the one or more sensors, determining one or more second parameters based on the third sensor data, and adapting either operation of the robotic vehicle or one or more characteristics of the robotic vehicle based on the one or more second parameters. In one embodiment, adapting either the operation of the robotic vehicle or the one or more characteristics of the robotic vehicle based on the one or more second parameters comprises adapting: a restriction or limitation on a linear speed of movement of the robotic vehicle; a restriction or limitation on a linear acceleration of the robotic vehicle; a restriction or limitation on a linear deceleration of the robotic vehicle; a restriction or limitation on a rotational speed of movement of the robotic vehicle; a restriction or limitation on a rotational acceleration of the robotic vehicle; a restriction or limitation on a rotational deceleration of the robotic vehicle; or a combination of any two or more of the above. In another embodiment, adapting either the operation of the robotic vehicle or the one or more characteristics of the robotic vehicle based on the one or more second parameters comprises adapting a suspension of the robotic vehicle based on the one or more second parameters.

Embodiments of a robotic vehicle are also disclosed. In one embodiment, a robotic vehicle includes a lifting mechanism including a lifting body and one or more sensors and a controller associated with the lifting mechanism. The controller is configured to cause the lifting mechanism to lift a load, cause the robotic vehicle to apply a first pulse of force to the load, obtain, from the one or more sensors, first sensor data related to movement of the load responsive to the first pulse of force applied to the load, determine one or more parameters related to the load based on the first sensor data, and perform one or more actions based on the one or more parameters related to the load.

BRIEF DESCRIPTION OF THE DRAWINGS

Embodiments will be described, by way of example only, with reference to the accompanying figures wherein:

FIG. 6 depicts a non-limiting embodiment for a home page of an administrator.

Like reference numerals are used in the drawings to denote like elements and features.

DETAILED DESCRIPTION OF EMBODIMENTS

Robotic vehicles are increasingly being used in warehouses to lift and carry pallets around the warehouses. One issue is that the loads on the pallets may or may not be safely packed. This may result in accidents in which loads fall while the robotic vehicles are moving the pallets around the warehouse. Such accidents may result in injuries to people working in the warehouse. Such accidents may additionally or alternatively result in lost productivity since these accidents require human intervention to correct (e.g., restack the load onto the pallet) and in some extreme cases may result in complete shutdown of all robotic vehicles in the warehouse (e.g., in a case where an accident blocks a primary route through the warehouse).

One naïve solution to this problem would be to have people verify that loads are stacked properly before the loads are moved by robotic vehicles. However, such a solution would require a significant amount of workers and time, particularly in large warehouses of the type in which such robotic vehicles are normally used. In addition, people are not always reliable and in many situations it may be difficult for a person to tell if a load is safely stacked on a pallet. For instance, from the person's perspective, the load may appear to be packed safely but, due to factors that are imperceptible to the person (e.g., differences in weight or density of items stacked on the pallet or the load may be top-heavy), the load may actually be unstable. As such, accidents may still occur even though the loads have been verified by a person before being moved.

Systems and methods are disclosed herein for performing an automated analysis of a load carried (e.g., on a platform such as, e.g., a pallet or table) by a robotic vehicle before the load is moved by the robotic vehicle. This analysis is, in one embodiment, performed by a corresponding automated load analysis system incorporated within or onto the robotic vehicle. In another embodiment, this analysis is performed by an external system that is, e.g., separate from the robotic vehicle (e.g., the stacked load (e.g., on a pallet) is tested by a separate automated load analysis system) prior to being loaded onto or picked-up by the robotic vehicle. As a result of the automated analysis, one or more actions are performed by the robotic vehicle or the automated load analysis system such as, e.g., deciding to place one or more restrictions on the movement (e.g., one or more restrictions on linear and/or angular velocity and/or acceleration) of the robotic vehicle while moving the load, adapting one or more characteristics of the robotic vehicle (e.g., adapting suspension), or the like.

Figure 1:
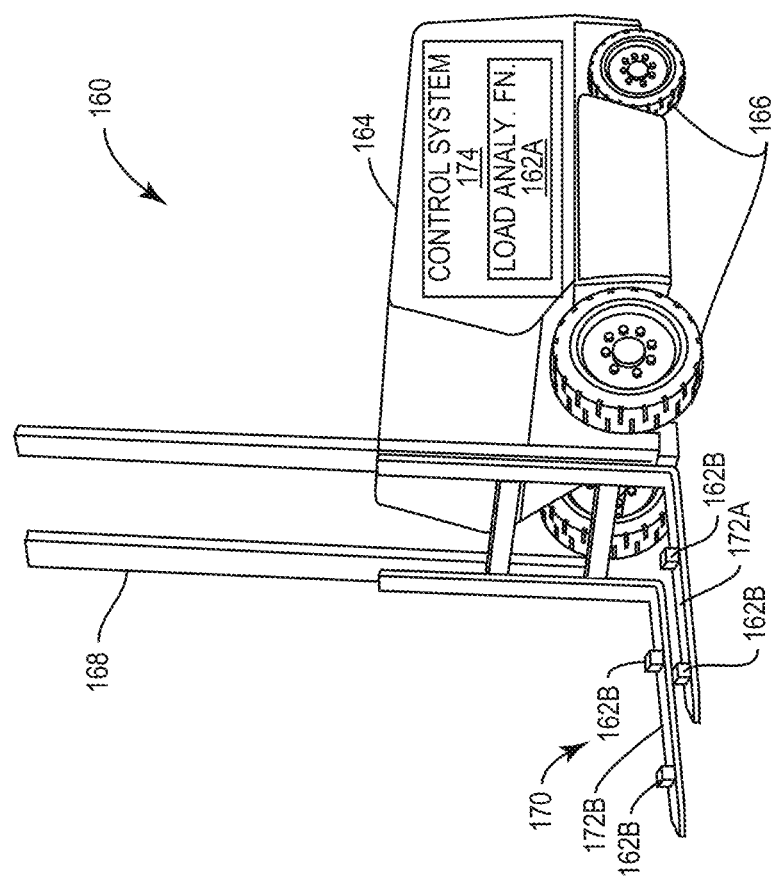
FIG. 1 illustrates one example of a robotic vehicle including an automated load analysis system in accordance with an embodiment of the present disclosure.
Figure 1:
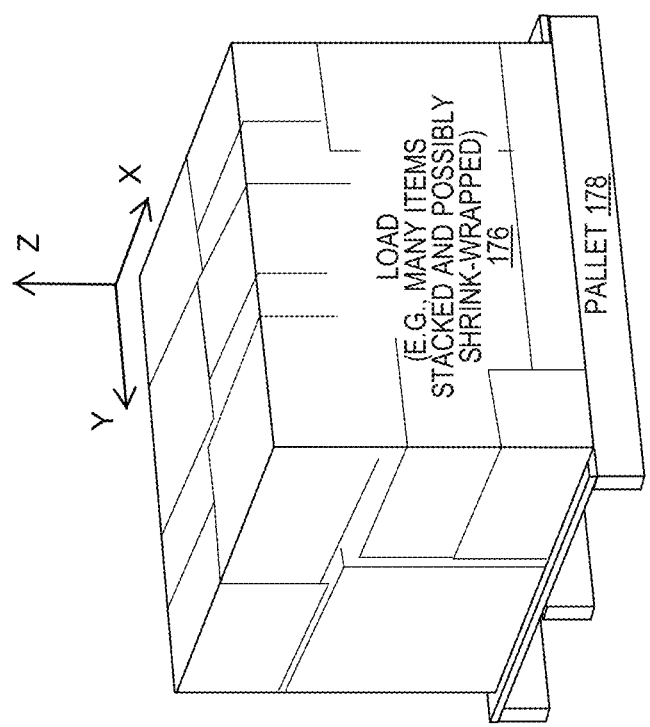

FIG. 1 illustrates one example of a robotic vehicle 160 including an automated load analysis system 162 in accordance with an embodiment of the present disclosure. Note that while the automated load analysis system 162 is included within, or as part of, the robotic vehicle 160 in this example embodiment, the automated load analysis system 162 may alternatively be a separate system that is attached or affixed to the robotic vehicle 160. The robotic vehicle 160 includes a vehicle body 164 including various electrical and mechanical components (e.g., a motor(s), a drivetrain, axels, suspension, etc.), wheels 166, a lifting mechanism 168 which in this particular embodiment is a forklift mechanism including a fork 170 including tines 172A and 172B, and a control system 174 that controls the overall operation of the robotic vehicle 160. In some embodiments, the fork 170 may have more or less than two tines. Additionally or alternatively, the fork 170 (or one or more of its tines) may be retractable (e.g., into the forklift mechanism or the vehicle body 164) or otherwise reconfigurable (e.g., detachable) or relocatable relative to the vehicle body 164 (e.g., to effect different placements of a pallet 178 relative to the vehicle body 164). In some embodiments, the components and wheels of the vehicle body 164 may be arranged and/or configured such that the robotic vehicle 160 is a differential wheeled robot. For example, the robotic vehicle 160 may have two drive wheels on opposing sides of the vehicle body 164. The drive wheels may be driven by a differential drive controller and the robotic vehicle 160 may have castor wheels for support. The automated load analysis system 162 includes a load analysis function 162A and sensors 162B for sensing and analyzing movement of a load 176 stacked on the pallet 178 that is carried by the robotic vehicle 160 via the tines 172A and 172B of the fork 170 of the lifting mechanism 168. While the automated load analysis system 162 and thus the sensors 162B are part of the robotic vehicle 160 in this example, the sensors 162B may alternatively be separate from the robotic vehicle 160 (e.g., attached to or integrated into the pallet 178 where the sensors 162B are communicatively coupled to the robotic vehicle 160 via any suitable wireless connection or electrical contact. Note that the load 176 preferably includes multiple items that are stacked on the pallet 178. The load analysis function 162A is preferably implemented in software that is executed by processing circuitry (e.g., one or more Central Processing Units (CPUs), microcontrollers, Digital Signal Processors (DSPs), Application Specific Integrated Circuits (ASICs), Field Programmable Gate Arrays (FPGAs), and/or the like) to perform the operations of the load analysis function 162A described herein. In this illustrated example, the load analysis function 162A is implemented within the control system 174 but is not limited thereto. Further, in this example, the sensors 162B are positioned on a surface of the tines 172A and 172B between the tines 172A and 172B and the pallet 178 such that the pallet 178 and thus the load 176 can be sensed via the sensors 162B. However, the sensors 162B may be otherwise positioned on the robotic vehicle 160 as long as the sensors 162B are able to sense movement of the load 176 in response to a force pulse applied to the load 176 as described herein. For instance, the sensors 162B may be, or include, sensors on or otherwise associated to the wheels 166 of the robotic vehicle 160. The sensors 162B may be, for example, pressure sensors that output data indicative of the pressure sensed by the sensors 162B, strain gauges on the tines 172A and 172B of the fork 170 of the lifting mechanism 168, or the like. The sensors 162B may also include one or more sensors for sensing whether the load 176 is wrapped (e.g., in a plastic wrap or film) or not. The sensors 162B are coupled to the load analysis function 162A such that the output data from the sensors 162B is received by the load analysis function 162A where this data is used to perform an automated analysis of the load 176, as described below in detail.

Figure 2:
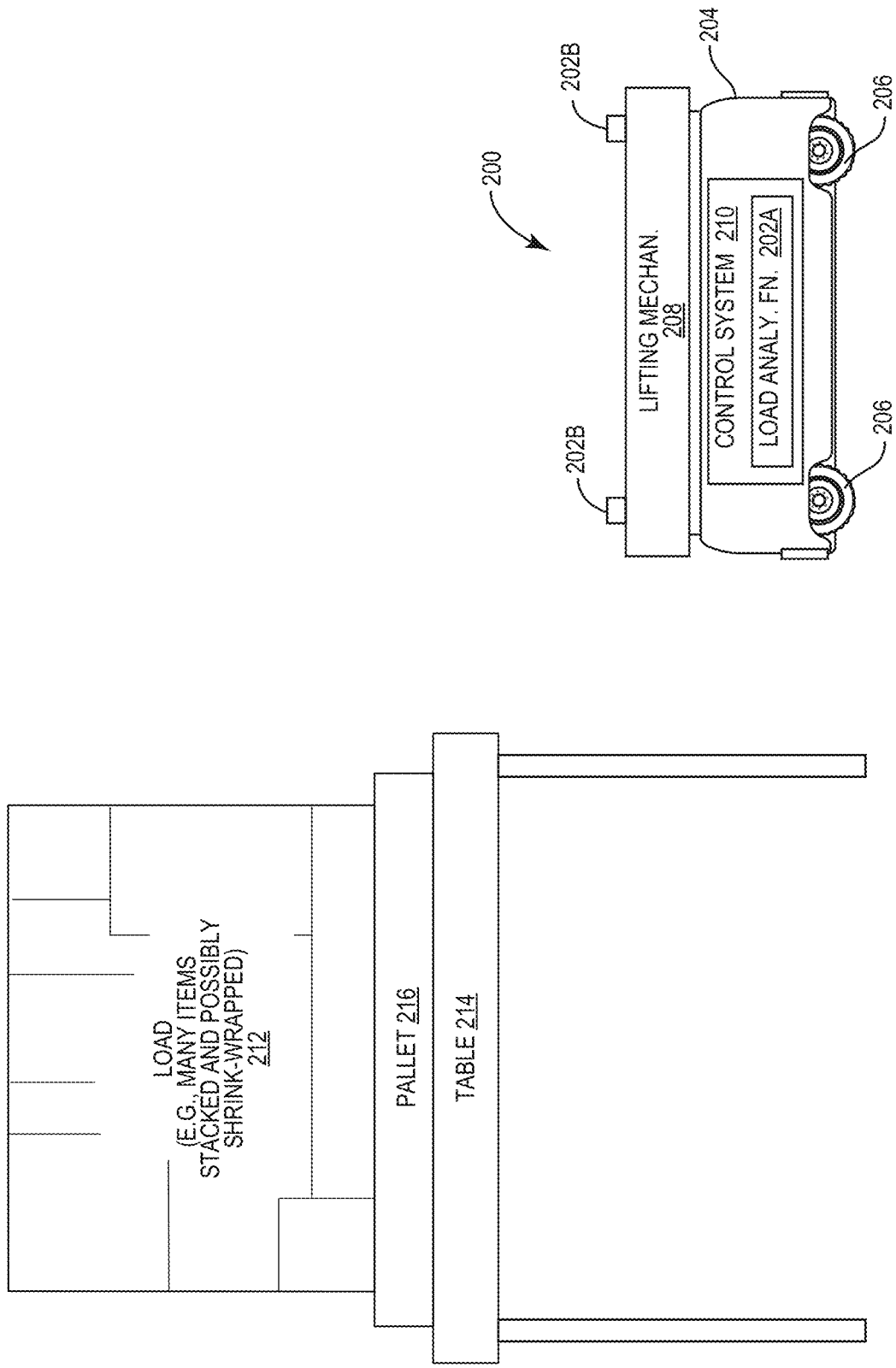
FIG. 2 illustrates another example of a robotic vehicle including an automated load analysis system in accordance with an embodiment of the present disclosure.

FIG. 2 illustrates another example of a robotic vehicle 200 including an automated load analysis system 202 in accordance with an embodiment of the present disclosure. Note that while the automated load analysis system 202 is included within, or as part of, the robotic vehicle 200 in this example embodiment, the automated load analysis system 202 may alternatively be a separate system that is attached or affixed to the robotic vehicle 200. The robotic vehicle 200 includes a vehicle body 204 including various electrical and mechanical components (e.g., a motor(s), a drivetrain, axels, suspension, etc.), wheels 206, a lifting mechanism 208, and a control system 210 that controls the overall operation of the robotic vehicle 200. In this example, the robotic vehicle 200 carries a load 212 by moving under a table 214 on which the load 212 or on which a pallet 216 carrying the load 212 is placed and then lifting the table 214 and thus the load 212 via the lifting mechanism 208. The lifting mechanism 208 may be any suitable lifting mechanism such as, for example, a hydraulic lift. Note that the load 212 preferably includes multiple items that are stacked on a top surface of the table 214 or on the pallet 216. The automated load analysis system 202 includes a load analysis function 202A and sensors 202B for sensing and analyzing movement of the load 212 that is carried by the robotic vehicle 200, e.g., via the lifting mechanism 208. In some embodiments, the load 212 may be carried or otherwise directly supported by the vehicle body 204. Additionally or alternatively, the lifting mechanism 208 may be configured such that it only carries or otherwise directly supports the load 212 for the purpose of placing or removing it from the vehicle body 204. Additionally or alternatively, while the automated load analysis system 202 and thus the sensors 202B are part of the robotic vehicle 200 in this example, the sensors 202B may alternatively be separate from the robotic vehicle 200 (e.g., attached to or integrated into the table 214 or pallet 216 where the sensors 202B are communicatively coupled to the robotic vehicle 200 via any suitable wireless connection or electrical contact. The load analysis function 202A is preferably implemented in software that is executed by processing circuitry (e.g., one or more CPUs, ASICs, FPGAs, and/or the like) to perform the operations of the load analysis function 202A described herein. In this illustrated example, the load analysis function 202A is implemented within the control system 210 but is not limited thereto. Further, in this example, the sensors 202B are positioned on a surface of the lifting mechanism 208 between a surface of the lifting mechanism 208 and a bottom of the table 214 such that the load 212 can be sensed via the sensors 202B. However, the sensors 202B may be otherwise positioned on the robotic vehicle 200 as long as the sensors 202B are able to sense movement of the load 212 in response to a force pulse applied to the load 212 as described herein. For instance, the sensors 202B may be, or include, sensors on or otherwise associated to the wheels 206 of the robotic vehicle 200. The sensors 202B may be, for example, pressure sensors that output data indicative of the pressure sensed by the sensors 202B. The sensors 202B are coupled to the load analysis function 202A such that the output data from the sensors 202B is received by the load analysis function 202A where this data is used to perform an automated analysis of the load 212, as described below in detail. The sensors 202B may be selected to provide sensor data required to observe and/or control one or more modes of motion of the robotic vehicle 160 and/or the load 212 (e.g., sloshing from side to side, bouncing up and down, twisting back and forth, etc.).

Note that the robotic vehicles 160 and 200 of FIGS. 1 and 2 respectively are only examples. Other types of robotic vehicles may be used in combination with an automated load analysis system, such as the automated load analysis system 162 or 202, to analyze a load carried by the robotic vehicle and perform one or more actions based on a result(s) of the analysis.

Also note that in the example embodiments of FIGS. 1 and 2, while the automated load analysis systems 162 and 202 are included as part of the robotic vehicles 160 and 200 where, as discussed below, the robotic vehicles 160 and 200 apply a force pulse(s) to the load 176 and 212 for the automated load analysis, the present disclosure is not limited thereto. In an alternative embodiment, the automated load analysis system 162 or 202 is part of a separate system where this separate system includes a mechanism for applying a force pulse(s) to the load 176 or 212 for automated load analysis prior to placing the load 176 or 212 (or the pallet 178 or 216 on which the load 176 or 212 is stacked) onto the robotic vehicle 160 or 200.

Figure 3:
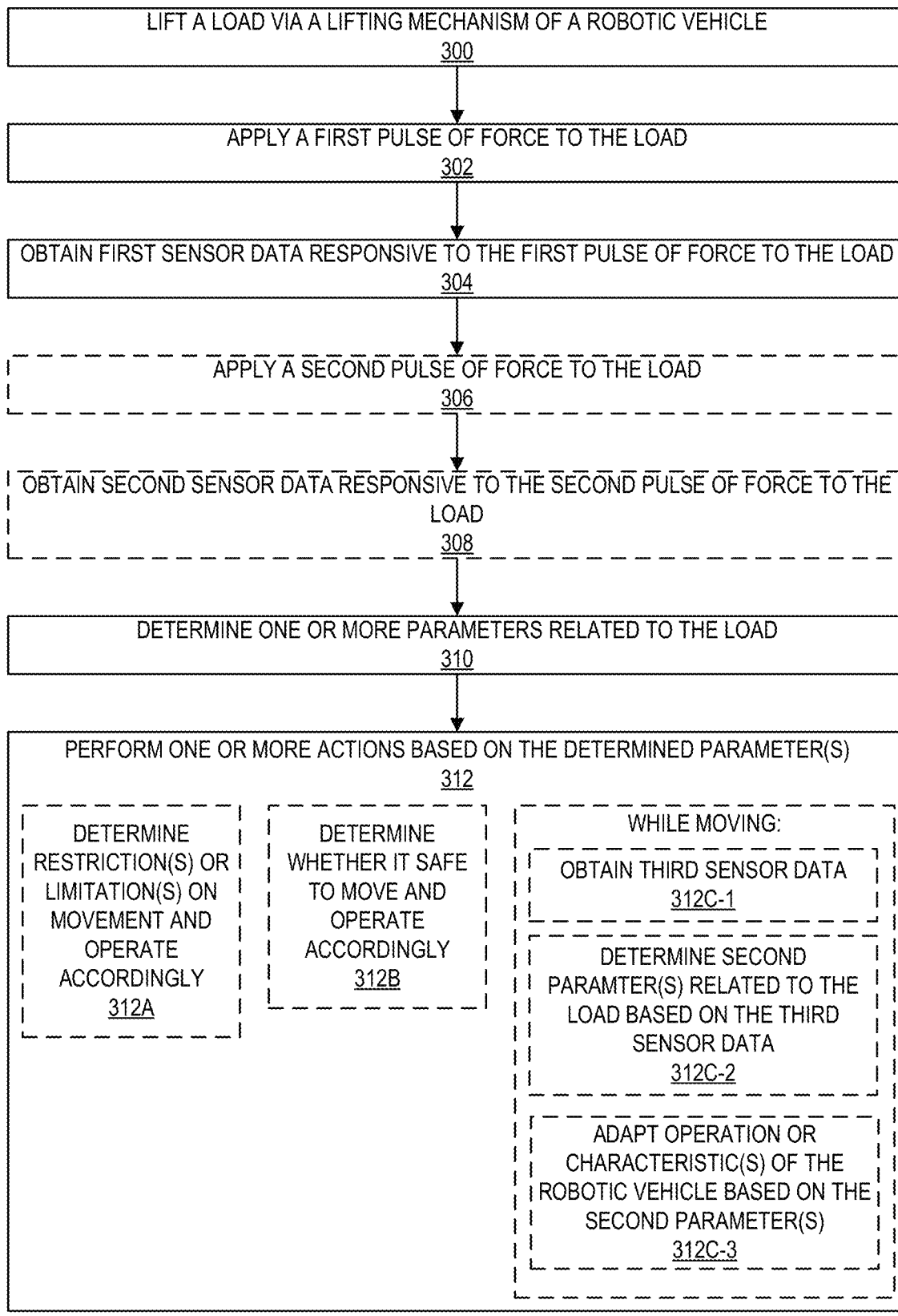
FIG. 3 is a flow chart that illustrates an automated load analysis procedure in accordance with an embodiment of the present disclosure.

FIG. 3 is a flow chart that illustrates an automated load analysis procedure in accordance with an embodiment of the present disclosure. In the following description, references are made to the robotic vehicles 160 and 200 and the automated load analysis systems 162 and 202 of FIGS. 1 and 2, respectively, for clarity and ease of discussion. Note, however, that this procedure is not limited to being performed by the example systems of FIGS. 1 and 2. As illustrated in FIG. 3, the load 176 or 212 is first lifted by the lifting mechanism 168 or 208 of the robotic vehicle 160 or 200 (step 300). The robotic vehicle 160 or 200 applies a first pulse of force to the load 176 or 212 (step 302). Preferably, the first pulse of force is such that it approximates (e.g., can be treated as) an impulse (e.g., as might be characterized using a Dirac delta function). The first pulse of force may be a lateral pulse of force, a rotational pulse of force, or a combination thereof. For example, the first pulse of force may be applied to the load 176 or 212 by the robotic vehicle 160 or 200 accelerating or decelerating. This acceleration or deceleration may be a known (e.g., predefined or configured) amount of acceleration or deceleration (e.g., X meters per second squared where the value "X" is known). The acceleration or deceleration may be a known (e.g., predefined or configured) starting velocity and/or for a known amount of time (e.g., predefined or configured). As another example, the first pulse of force may be applied to the load 176 or 212 by the robotic vehicle 160 or 200 rotating, e.g., while otherwise at rest, while moving at a constant velocity, or while accelerating or decelerating at a known rate). The acceleration or deceleration may be sudden (e.g., to better approximate an impulse).

Figure 4A:
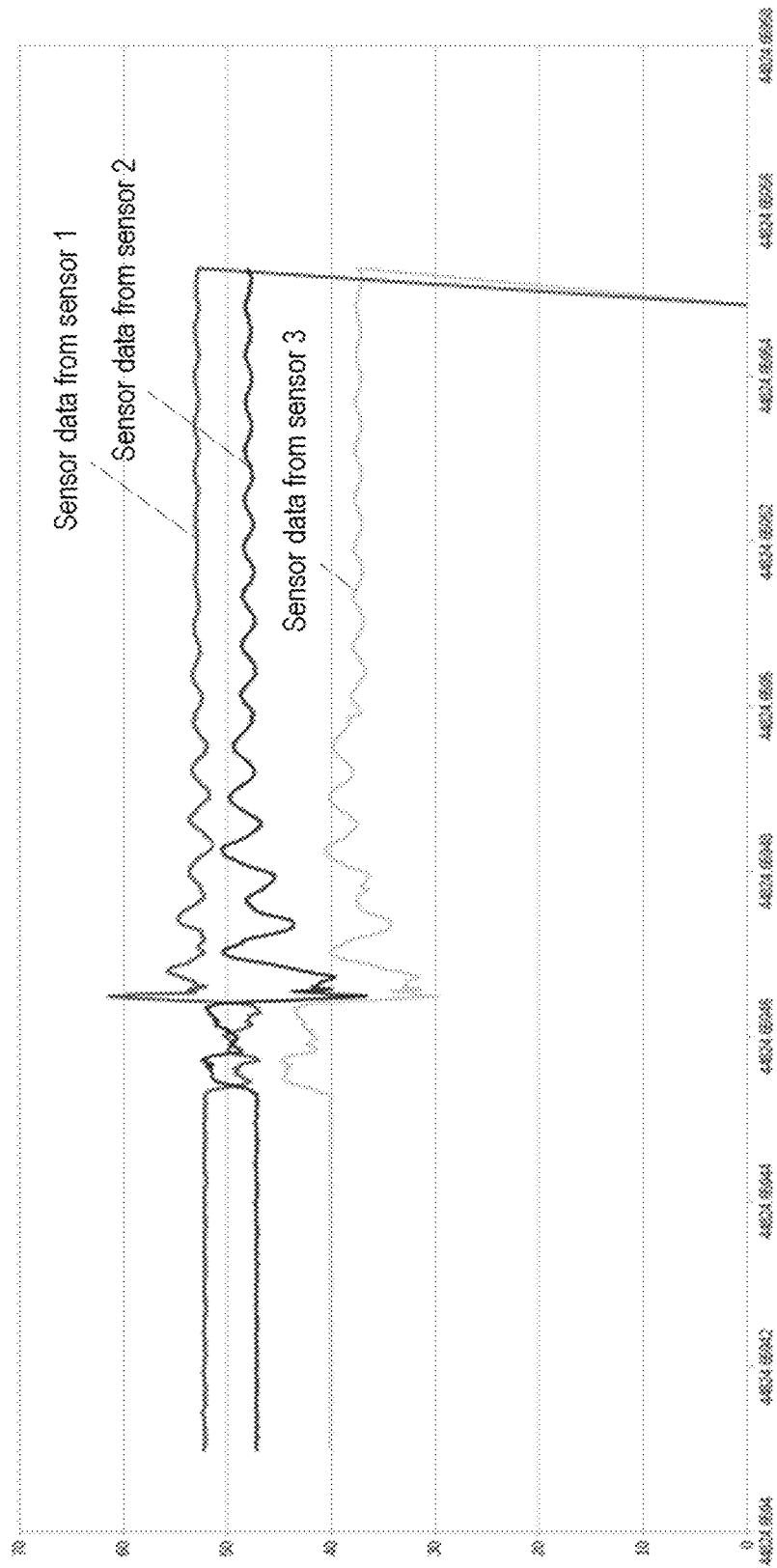
FIG. 4A illustrates one example of the sensor data from three sensors, where the sensors are pressure sensors in accordance with an embodiment of the present disclosure.
Figure 4B:
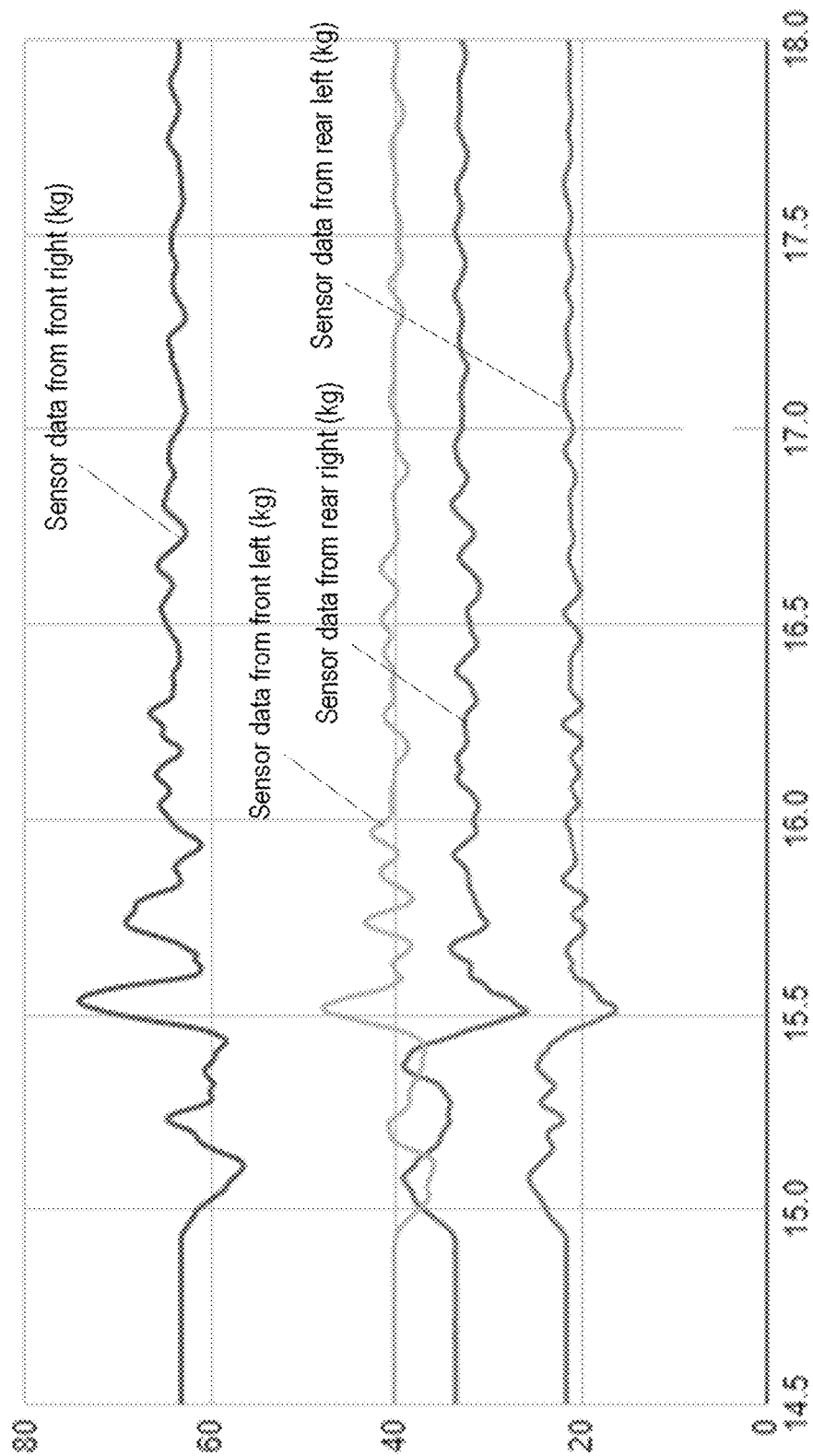
FIG. 4B illustrates another example of the sensor data from four sensors in accordance with another embodiment of the present disclosure.
Figure 4C:
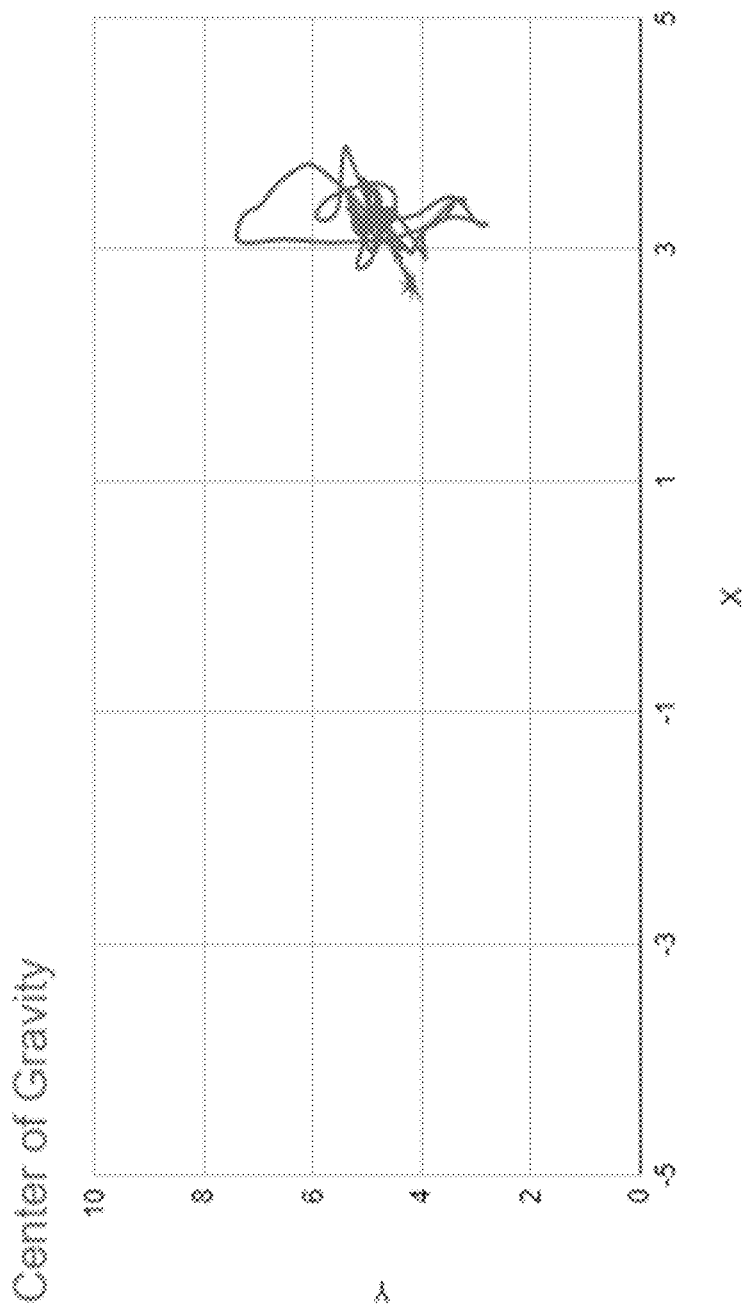
FIG. 4C is an X-Y plot of the center of gravity of a load moving during an impulse in the Y direction determined in accordance with one example embodiment of the present disclosure.

First sensor data is obtained, e.g., by the load analysis function 162A or 202A from the sensors 162B or 202B, responsive to the first pulse of force applied to the load 176 or 212 (step 304). In other words, the first sensor data is data obtained from the sensors 162B or 202B during a time window in which the load 176 or 212 moves in response to applying the first pulse of force. This period of time may, for example, start before, at, or just after applying the first pulse of force and continue over some duration of time in which the load 176 or 212 moves as a result of the first pulse of force. FIG. 4A is a time-based graph that illustrate one example of the sensor data from three sensors, where the sensors are pressure sensors. As can be seen in FIG. 4A, the sensor data from each sensor provides a series of sensor readings over time that form a waveform that is indicative of the movement of the load 176 or 212 relative to the sensor in response to the first pulse of force. FIG. 4B illustrates another example of sensor data from four sensors, i.e. a front right sensor, a front left sensor, a rear right sensor, and a rear left sensor, where the sensors are pressure sensors. As can be seen in FIG. 4B, the sensor data from each sensor provides a series of sensor readings over time that form a waveform that is indicative of the movement of the load 176 or 212 relative to the sensor in response to the first pulse of force. FIG. 4C illustrates an x-y plot of the center of gravity of the load 176 or 212 moving during an impulse in the Y direction, which is derived from the sensor data.

Optionally, the robotic vehicle 160 or 200 applies a second pulse of force to the load 176 or 212 (step 306). Preferably, the second pulse of force is such that it approximates (e.g., can be treated as) an impulse. The second pulse of force may be a lateral pulse of force, a rotational pulse of force, or a combination thereof. The second pulse force is preferably different in type than the first pulse of force. For example, if the first pulse of force is a lateral pulse of force, the second pulse of force may be a rotational pulse of force. Second sensor data is obtained, e.g., by the load analysis function 162A or 202A from the sensors 162B or 202B, responsive to the second pulse of force applied to the load 176 or 212 (step 308). In other words, the second sensor data is data obtained from the sensors 162B or 202B during a time window in which the load 176 or 212 moves in response to applying the second pulse of force. This period of time may, for example, start before, at, or just after applying the second pulse of force and continue over some duration of time in which the load 176 or 212 moves as a result of the first pulse of force.

The load analysis function 162A or 202A determines one or more parameters related to the load 176 or 212 based on the first sensor data and optionally (i.e., if steps 306 and 308 are performed) the second sensor data (step 310). When determining the one or more parameters related to the load 176 or 212, the load analysis function 162A or 202A may further consider the known first pulse of force and, if steps 306 and 308 are performed, the second pulse of force. The one or more parameters may be any parameters related to the load 176 or 212 that are indicative of one or more characteristics of the load 176 or 212 that can be derived from the first sensor data and optionally the known first pulse of force and still further, if steps 306 and 308 are performed, the second sensor data and optionally the known second pulse of force. The one or more parameters are also any such parameter(s) that can be used to determine whether the load 176 or 212 is stable or at least sufficiently stable for the robotic vehicle 160 or 200 to move the load 176 or 212 or move the load 176 or 212 in a restricted manner (e.g., with one or more restrictions such as, e.g., a restriction on the rate of acceleration and/or deceleration, a restriction on speed, a restriction on rotational speed, a restriction on rotational acceleration, or the like). Some examples of the one or more parameters related to the load 176 or 212 determined in step 310 include, but are not limited to:

center of gravity of the load 176 or 212 (e.g., two-dimensional central of gravity in a lateral plane (X-Z or Y-Z plane) of the load 176 or 212);

The two-dimensional center of gravity of the load 176 or 212 in the X-Z plane may be determined based on the sensor data by using the center of gravity data to determine a point in the X-Z plane around which the load 176 or 212 moves. Note that the two-dimensional center of gravity in the X-Z plane may also be determined from obtaining data from the sensors 162B or 202B while lifting the load 176 or 212.

an amplitude of a response of the load 176 or 212 as represented by the sensor obtained from the one or more sensors 162B or 202B responsive to the first pulse of force and/or optionally the second pulse of force;

This may include the amplitude or maximum amplitude of the sensor data from any one sensor, a combination (e.g., average) of the amplitude or maximum amplitude of the sensor data from all of the sensors, or the like.

a resonant frequency or natural frequency of the load 176 or 212;

The resonant frequency of the load 176 or 212 may be computed from the sensor data by observing the frequency components of the sensor data. For instance, the frequency and amplitude of the waveform provided by the sensor data of a sensor may be used to determine a damped resonant frequency of the load 176 or 212 from which the resonant frequency of the load 176 or 212 can be determined.

a damping factor, or ratio, of the load 176 or 212;

The damping factor, or ratio, may be computed from the amplitude of the sensor data from any one or a combination of the sensors 162B or 202B over time.

an amount of movement of the load 176 or 212 in response to the first pulse of force and/or the second pulse of force (e.g., an amount of side-to-side movement of the load 176 or 212 in response to the first/second pulse of force, an amount of up-and-down movement of the load 176 or 212 in response to the first/second pulse of force, an amount of front-to-back movement of the load 176 or 212 in response to the first/second pulse of force, or the like), where the "amount of movement" may be determined based on the amplitudes of the sensor data received from the sensors 162B or 202B and may possibly be normalized based on an amplitude of the first/second pulse of force;

a frequency of movement of the load 176 or 212 (e.g., a frequency at which the load 176 or 212 moves from side-to-side in response to the first/second pulse of force, a frequency at which the load 176 or 212 moves up-and-down in response to the first/second pulse of force, a frequency at which the load 176 or 212 moves front-to-back in response to the first/second pulse of force, or the like);

a polar moment of inertia of the load 176 or 212 or possibly more than one polar moment of inertia (e.g., both horizontal and vertical polar moments of inertia);

one or more parameters based on the sensor data from the sensors 162B or 202B relative to one another or a comparison of the sensor data from the different sensors 162B or 202B (e.g., an amount of time between a peak in the amplitude of one sensor and a peak in the amplitude of another sensor, a phase difference between the sensor data from one sensor and the sensor data from another sensor, an amplitude difference between the sensor data from one sensor and the sensor data from another sensor, etc.);

Note that the relative amplitudes and/or phases of the sensor data from different sensors may be used to compute various parameters. For example, considering a load on a pallet with a grid of four sensors—two on each of the two tines of a fork on a forklift, then the amplitudes and phases of the sensor data from the four sensors can be used to determine an axis in the lateral plane (i.e., the X-Z plane) about which the load 176 or 212 sways back-and-forth and well as the magnitude of the sway in either direction.

a parameter(s) related to (e.g., measuring) one or more desired modes of motion of the load 176 or 212 (e.g., sloshing from side-to-side, bouncing up-and-down, twisting back-and-forth, etc.);

a parameter indicative of whether the load 176 or 212 is wrapped (e.g., in a plastic wrap or film) or not.

Note that the type of force(s) pulse applied and/or the number of sensors 162B or 202B and/or the arrangement or positioning of the sensors 162B or 202B may vary depending on the particular parameter(s) to be determined as different parameters may require different types of force pulses and/or different numbers of sensors and/or different arrangements of the sensors.

Next, one or more actions are performed based on the one or more parameters related to the load 176 or 212 determined in step 310 (step 312). In one embodiment, the one or more actions include determining one or more restrictions or limitations on movement of the robotic vehicle 160 or 200 based on the one or more parameters related to the load 176 or 212 and operating the robotic vehicle 160 or 200 in accordance with the one or more restrictions (step 312A). The one or more restrictions may include any one or more of the following:

a restriction or limitation on a linear speed of movement of the robotic vehicle 160 or 200;

a restriction or limitation on a linear acceleration of the robotic vehicle 160 or 200;

a restriction or limitation on a linear deceleration of the robotic vehicle 160 or 200;

a restriction or limitation on a rotational speed of movement of the robotic vehicle 160 or 200;

a restriction or limitation on a rotational acceleration of the robotic vehicle 160 or 200;

a restriction or limitation on a rotational deceleration of the robotic vehicle 160 or 200; or a combination of any two or more of the restrictions above.

In another embodiment, the one or more actions include determining whether it is safe for the robotic vehicle 160 or 200 to move the load 176 or 212 based on the one or more parameters related to the load 176 or 212 and operating the robotic vehicle 160 or 200 in accordance with a result of determining whether it is safe for the robotic vehicle 160 or 200 to move the load 176 or 212 (step 312B).

In another embodiment, the one or more actions performed in step 312 include, while moving the load 176 or 212 via the robotic vehicle 160 or 200, obtaining third sensor data from the sensors 162B or 202B (step 312C-1), determining one or more second parameters related to the load 176 or 212 based on the third sensor data (step 312C-2), and adapting either operation of the robotic vehicle 160 or 200 or one or more characteristics of the robotic vehicle 160 or 200 based on the one or more second parameters (step 312C-3). The one or more second parameters may include an amount of movement of the load 176 or 212 (e.g., amount of movement in an up-and-down direction based on the amplitude of sensor data), dominant frequency or frequencies of movement of the load 176 or 212 (e.g., the dominant frequency or frequencies of oscillation in the sensor data), or any other of the parameters described above with respect to the one or more first parameters. In one embodiment, the adaptation includes adaptation of the operation of the robotic vehicle 160 or 200 based on the one or more second parameters, where this adaptation includes any one or more of the following:

adapting a restriction or limitation on a linear speed of movement of the robotic vehicle 160 or 200;

adapting a restriction or limitation on a linear acceleration of the robotic vehicle 160 or 200;

adapting a restriction or limitation on a linear deceleration of the robotic vehicle 160 or 200;

adapting a restriction or limitation on a rotational speed of movement of the robotic vehicle 160 or 200;

adapting a restriction or limitation on a rotational acceleration of the robotic vehicle 160 or 200;

adapting a restriction or limitation on a rotational deceleration of the robotic vehicle 160 or 200;

adapting any such restriction or limitation on the movement of the robotic vehicle 160 or 200 in order to prevent or mitigate the cause of the vehicle being driven at or near its determined resonant or natural frequency (e.g., preventing a certain speed over a floor with regularly-spaced speed bumps);

adapting a restriction or limitation on the movement of the robotic vehicle 160 or 200 such that the vehicle must then have a speed above a determined minimum speed (e.g., to address a floor with regularly-spaced speed bumps);

adapting a restriction or limitation on the movement of the robotic vehicle 160 or 200 such that the restriction or limitation only applies to specific locations (e.g., a specific aisle in a warehouse); or a combination of any two or more of the above adaptations.

In another embodiment, the adaptation of the operation of the robotic vehicle 160 or 200 may include stopping the robotic vehicle 160 or 200. In yet another embodiment, the adaptation of the operation of the robotic vehicle 160 or 200 may include controlling the robotic vehicle 160 or 200 such that the robotic vehicle 160 or 200 moves to a safe place (e.g., one of a set of predefined or preconfigured safe stopping places) and stops at the safe place. In another embodiment, the adaptation includes adaptation of one or more characteristics of the robotic vehicle 160 or 200 based on the one or more second parameters, where the adapted characteristics may include, e.g., one or more characteristics of a suspension system of the robotic vehicle 160 or 200 where the suspension system is thereby adapted in a manner that stabilizes the load 176 or 212 if the load 176 or 212 is determined to be unstable based on the second parameter(s).

Embodiments of the present disclosure may be utilized in any environment in which a robotic vehicle is to move a load. One example is a warehouse used to store items sold via online stores made available via an e-commerce platform such as, e.g., the e-commerce platform described below with respect to FIG. 5 and FIG. 6.

Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 5:
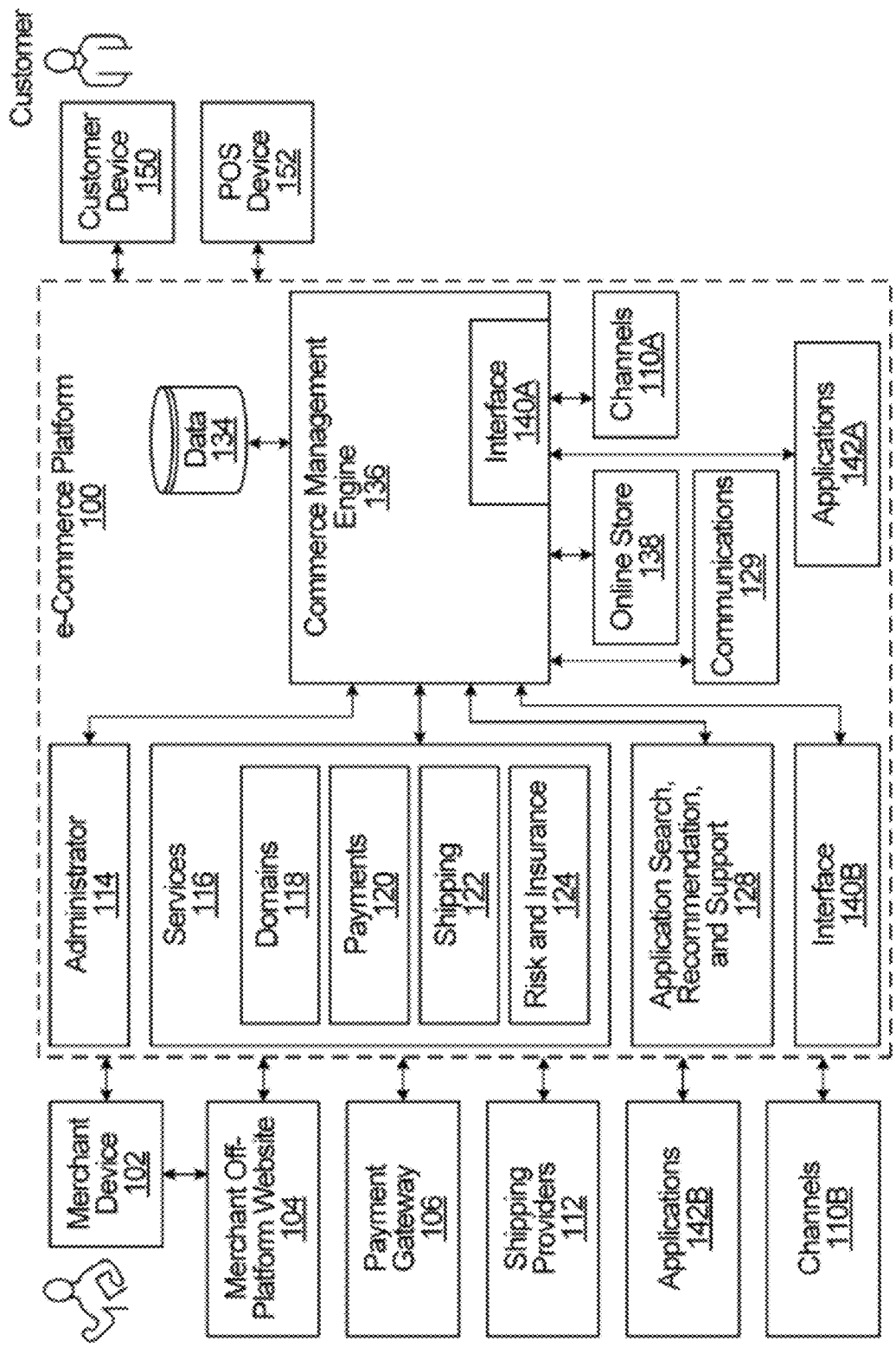
FIG. 5 illustrates an example e-commerce platform, according to one embodiment.

FIG. 5 illustrates an example e-commerce platform 100, according to one embodiment. The e-commerce platform 100 may be exemplary of the e-commerce platform 105 described with reference to FIG. 6. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a "merchant" and a "customer" may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to "merchants" and "customers", and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 5, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point-of-sale (POS) devices 152 in physical locations (e.g., a physical storefront or other location such as through a kiosk, terminal, reader, printer, 3D printer, and the like).

A merchant may utilize the e-commerce platform 100 as a sole commerce presence with customers, or in conjunction with other merchant commerce facilities, such as through a physical store (e.g., "brick-and-mortar" retail stores), a merchant off-platform website 104 (e.g., a commerce Internet website or other internet or web property or asset supported by or on behalf of the merchant separately from the e-commerce platform 100), an application 142B, and the like. However, even these "other" merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through "buy buttons" that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the c-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point-of-sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (Saas), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colours, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment facility 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 6 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 6. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a "view all recent activity" dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 5, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the case of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and colour, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A method comprising:
lifting a load via a lifting mechanism of a robotic vehicle;
applying a first pulse of force to the load;
obtaining, from one or more sensors, first sensor data related to movement of the load responsive to the first pulse of force applied to the load;
determining one or more parameters related to the load based on the first sensor data; and
performing one or more actions based on the one or more parameters related to the load.

2. The method of claim 1 wherein the first pulse of force applied to the load is either a pulse of lateral force, a pulse of rotational force, or pulse of combined lateral and rotational forces.

3. The method of claim 1 wherein the first pulse of force is applied to the load by the robotic vehicle.

4. The method of claim 1 wherein the one or more parameters related to the load include:
a center of gravity of the load;
a two-dimensional center of gravity of the load in a lateral plane (X-Z or Y-Z plane) of the load;
an amplitude of a response of the load as represented by the first sensor data obtained from the one or more sensors responsive to the first pulse of force;
a resonant frequency or natural frequency of the load;
a damping factor of the load;
one or more parameters indicative of an amount of movement or frequency of movement of the load;
a polar moment of inertia of the load;
at least one parameter that is based on the first sensor data from a first sensor of the one or more sensors relative to the first sensor data from a second sensor of the one or more sensors; or
a combination of any two or more thereof.

5. The method of claim 1 wherein the first pulse of force applied to the load is one of a pulse of lateral force and a pulse of rotational force, and the method further comprises:
applying a second pulse of force to the load, the second pulse of force being the other of a pulse of lateral force and a pulse of rotational force; and
obtaining second sensor data from the one or more sensors responsive to the second pulse of force applied to the load;
wherein determining the one or more parameters related to the load includes determining the one or more parameters related to the load based on both the first sensor data and the second sensor data.

6. The method of claim 1 wherein performing the one or more actions comprises:
determining one or more restrictions or limitations on movement of the robotic vehicle based on the one or more parameters related to the load; and
operating in accordance with the one or more restrictions or limitations on movement of the robotic vehicle.

7. The method of claim 6 wherein the one or more restrictions or limitations on movement of the robotic vehicle include:
a restriction or limitation on a linear speed of movement of the robotic vehicle;
a restriction or limitation on a linear acceleration of the robotic vehicle;
a restriction or limitation on a linear deceleration of the robotic vehicle;
a restriction or limitation on a rotational speed of movement of the robotic vehicle;
a restriction or limitation on a rotational acceleration of the robotic vehicle;
a restriction or limitation on a rotational deceleration of the robotic vehicle; or
a combination of any two or more of the above.

8. The method of claim 1 wherein performing the one or more actions comprises:
determining whether it is safe for the robotic vehicle to move the load based on the one or more parameters related to the load; and
operating in accordance with a result of determining whether it is safe for the robotic vehicle to move the load.

9. The method of claim 1 wherein the one or more sensors include one or more pressure sensors.

10. The method of claim 1 wherein the one or more sensors are located on the lifting mechanism.

11. The method of claim 1 wherein the one or more sensors include one or more pressure sensors implemented within or affixed to the lifting mechanism.

12. The method of claim 11 wherein the one or more pressure sensors are between a body of the lifting mechanism and a platform on which the load is positioned.

13. The method of claim 1 wherein the lifting mechanism includes a forklift including a fork having two or more tines, and the one or more sensors include one or more sensors integrated into or affixed to at least one of the two or more tines.

14. The method of claim 13 wherein the one or more sensors integrated into or affixed to the at least one of the two or more tines comprises at least one pressure sensor integrated into or affixed to the at least one of the two or more tines.

15. The method of claim 13 wherein the one or more sensors integrated into or affixed to the at least one of the two or more tines comprises at least one strain gauge integrated into or affixed to the at least one of the two or more tines.

16. The method of claim 1 wherein the one or more sensors include one or more sensors on one or more wheels of the robotic vehicle.

17. The method of claim 1 wherein performing the one or more actions comprises moving the load via the robotic vehicle, and the method further comprises:
while moving the load via the robotic vehicle:
obtaining third sensor data from the one or more sensors;
determining one or more second parameters based on the third sensor data; and
adapting either operation of the robotic vehicle or one or more characteristics of the robotic vehicle based on the one or more second parameters.

18. The method of claim 17 wherein adapting either the operation of the robotic vehicle or the one or more characteristics of the robotic vehicle based on the one or more second parameters comprises adapting:
a restriction or limitation on a linear speed of movement of the robotic vehicle;
a restriction or limitation on a linear acceleration of the robotic vehicle;

a restriction or limitation on a linear deceleration of the robotic vehicle;

a restriction or limitation on a rotational speed of movement of the robotic vehicle;

a restriction or limitation on a rotational acceleration of the robotic vehicle;

a restriction or limitation on a rotational deceleration of the robotic vehicle; or a combination of any two or more of the above.

19. The method of claim 17 wherein adapting either the operation of the robotic vehicle or the one or more characteristics of the robotic vehicle based on the one or more second parameters comprises adapting a suspension of the robotic vehicle based on the one or more second parameters.

20. A robotic vehicle comprising:

a lifting mechanism including a lifting body and one or more sensors; and a controller associated with the lifting mechanism, the controller configured to:

cause the lifting mechanism to lift a load;

cause the robotic vehicle to apply a first pulse of force to the load;

obtain, from the one or more sensors, first sensor data related to movement of the load responsive to the first pulse of force applied to the load;

determine one or more parameters related to the load based on the first sensor data; and perform one or more actions based on the one or more parameters related to the load.

* * * * *